United States Patent
Abuelsaad et al.

(10) Patent No.: US 9,747,891 B1
(45) Date of Patent: Aug. 29, 2017

(54) NAME PRONUNCIATION RECOMMENDATION

(71) Applicant: INTERNATIONAL BUSINESS MACHINES CORPORATION, Armonk, NY (US)

(72) Inventors: Kelly Abuelsaad, Somers, NY (US); Kulvir S. Bhogal, Fort Worth, TX (US); Lisa Seacat DeLuca, Baltimore, MD (US); Soobaek Jang, Hamden, CT (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/157,544

(22) Filed: May 18, 2016

(51) Int. Cl.
*G10L 15/02* (2006.01)
*G10L 25/51* (2013.01)
*G10L 15/06* (2013.01)
*G06F 17/30* (2006.01)

(52) U.S. Cl.
CPC ........ *G10L 15/02* (2013.01); *G06F 17/30758* (2013.01); *G10L 15/063* (2013.01); *G10L 25/51* (2013.01); *G10L 2015/0631* (2013.01)

(58) Field of Classification Search
USPC .................................. 704/231–257, 270–275
See application file for complete search history.

(56) References Cited

U.S. PATENT DOCUMENTS

| 6,272,464 | B1 * | 8/2001 | Kiraz ..................... G10L 15/187 704/231 |
| 2002/0013707 | A1 * | 1/2002 | Shaw ..................... G10L 15/063 704/257 |
| 2004/0153306 | A1 * | 8/2004 | Tanner ................... G06F 17/273 704/4 |
| 2007/0255567 | A1 | 11/2007 | Bangalore et al. |
| 2008/0208574 | A1 | 8/2008 | Chen et al. |
| 2008/0240382 | A1 | 10/2008 | Fujita-Yuhas |
| 2009/0144052 | A1 * | 6/2009 | Lee ....................... G06F 17/2735 704/10 |
| 2009/0190728 | A1 | 7/2009 | Bushnell et al. |
| 2011/0238412 | A1 * | 9/2011 | Ezzat .................... G10L 15/187 704/10 |
| 2011/0250570 | A1 | 10/2011 | Mack |
| 2012/0016663 | A1 | 1/2012 | Gillam et al. |

(Continued)

FOREIGN PATENT DOCUMENTS

EP            372734 A1       6/1990

OTHER PUBLICATIONS

Anonymous, "Name pronunciation in electronic media or documents", ip.com, IPCOMOOO197937d, Jul. 22, 2010, pp. 1-4.

*Primary Examiner* — Jesse Pullias
(74) *Attorney, Agent, or Firm* — Cantor Colburn LLP; Kurt Goudy (57) ABSTRACT

A method for recommending the pronunciation of a name includes providing a plurality of audio records wherein the audio records include a set of audio records identifying the pronunciation of a common name. The method also includes analyzing the set of audio records identifying the pronunciation to determine the most frequent common pronunciation of the common name in the set of audio records. Once determined, the most frequent common pronunciation of the common name is presented to an end user.

20 Claims, 5 Drawing Sheets

| | | | | | | |
|---|---|---|---|---|---|---|
| 270a → | N1 | Name1 | India | Male | USA | Audio File |
| 270b → | N2 | Name1 | India | Male | USA | Audio File |
| 280a → | N3 | Name1 | India | Male | India | Audio File |
| 280b → | N4 | Name1 | India | Male | England | Audio File |
| 290a → | N5 | Name1 | Latin America | Male | Ecuador | Audio File |
| 290b → | N6 | Name1 | Latin America | Male | Mexico | Audio File |

117

(56) References Cited

U.S. PATENT DOCUMENTS

2014/0379709 A1\* 12/2014 Mack .................... G09B 19/04
707/732
2016/0188727 A1\* 6/2016 Waibel .................... G09B 5/06
707/758

\* cited by examiner

| | | | | | |
|---|---|---|---|---|---|
| N1 | Name1 | India | Male | USA | Audio File |
| N2 | Name1 | India | Male | USA | Audio File |
| N3 | Name1 | India | Male | India | Audio File |
| N4 | Name1 | India | Male | England | Audio File |
| N5 | Name1 | Latin America | Male | Ecuador | Audio File |
| N6 | Name1 | Latin America | Male | Mexico | Audio File |

| N1 | Name 1 | India | Male | India | Audio File |
| N2 | Name 1 | India | Male | India | Audio File |
| N3 | Name 1 | India | Male | India | Audio File |
| N4 | Name 1 | India | Male | India | Audio File |
| N5 | Name 1 | India | Male | India | Audio File |

NAME PRONUNCIATION RECOMMENDATION

BACKGROUND

In a diverse workplace, one often comes across names of colleagues and clients that he or she may not know how to pronounce. Consequently there is a possibility that one may inadvertently mispronounce a name, which may lead to embarrassment or even potential loss of a business opportunity.

SUMMARY

In accordance with one or more embodiments, a method for recommending the pronunciation of a name is provided. The method includes providing a plurality of audio records wherein the audio records include a set of audio records identifying the pronunciation of a common name. The method also includes analyzing the set of audio records identifying the pronunciation of a common name to determine variations in the pronunciation and determining the most frequent common pronunciation of the common name. Once determined, the most frequent common pronunciation of the common name is presented to an end user.

In one or more embodiments of the invention, a system for recommending the pronunciation of a name includes a plurality of audio records wherein the plurality of audio records include a set of audio records identifying the pronunciation of a singular name. A processor analyzes the set of audio records identifying the pronunciation of a common name to determine variations in the pronunciation. The processor determines the most frequent common pronunciation of the common name, and a communications network delivers the most frequent common pronunciation of the common name to an end user.

In accordance with one or more embodiments, a computer program product for recommending the pronunciation of a name includes a computer readable storage medium having program instructions embodied therewith, wherein the computer readable storage medium is not a transitory signal per se, the program instructions readable by a processing circuit to cause the processing circuit to perform a method comprises providing a plurality of audio records wherein the plurality of audio records includes a set of audio records identifying the pronunciation of a common name. The method further includes analyzing the set of audio records identifying the pronunciation of a common name to determine variations in the pronunciation and determining the most frequent common pronunciation of the common name. Once the most frequent common pronunciation of the common name is determined, presenting the most frequent common pronunciation of the common name to an end user as the recommended pronunciation.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

One or more embodiments of the present disclosure present a name pronunciation recommendation system and method. Embodiments allow for an individual to inquire regarding the name pronunciation of an individual in a query. In one or more embodiments, the disclosed pronunciation recommendation system and method will look up individuals who have the same name and characteristics. In one or more embodiments, methods and systems for providing pronunciation recommendations are provided, which may include providing additional pronunciation guides including phonetic, textual and audio guides.

More specifically, one or more embodiments of the present invention provide a recommended pronunciation for a name based on a query submitted by an end user, and further based on additional parameters such as gender, citizenship and geographic location in the query to identify relevant audio files containing pronunciations of a common name with those specific characteristics. By associating the audio file with these additional characteristics, the audio files discovered are considered more relevant. For instance if the name "Jorge" is searched utilizing one or more embodiments of the present disclosure, the Spanish language pronunciation is quite different than the English language pronunciation. Hence, the factoring in the citizenship and/or geographic location should return only relevant audio files, namely either only the English language or the Spanish language pronunciations depending on the query request. Those files are statistically evaluated to determine the likelihood of the most accurate pronunciation of a name, and the pronunciation with the highest likelihood of accuracy is returned to the end user who submitted the initial inquiry. The audio files are obtained by mining the web for audio files having the same name and requested attributes.

Figure 1:
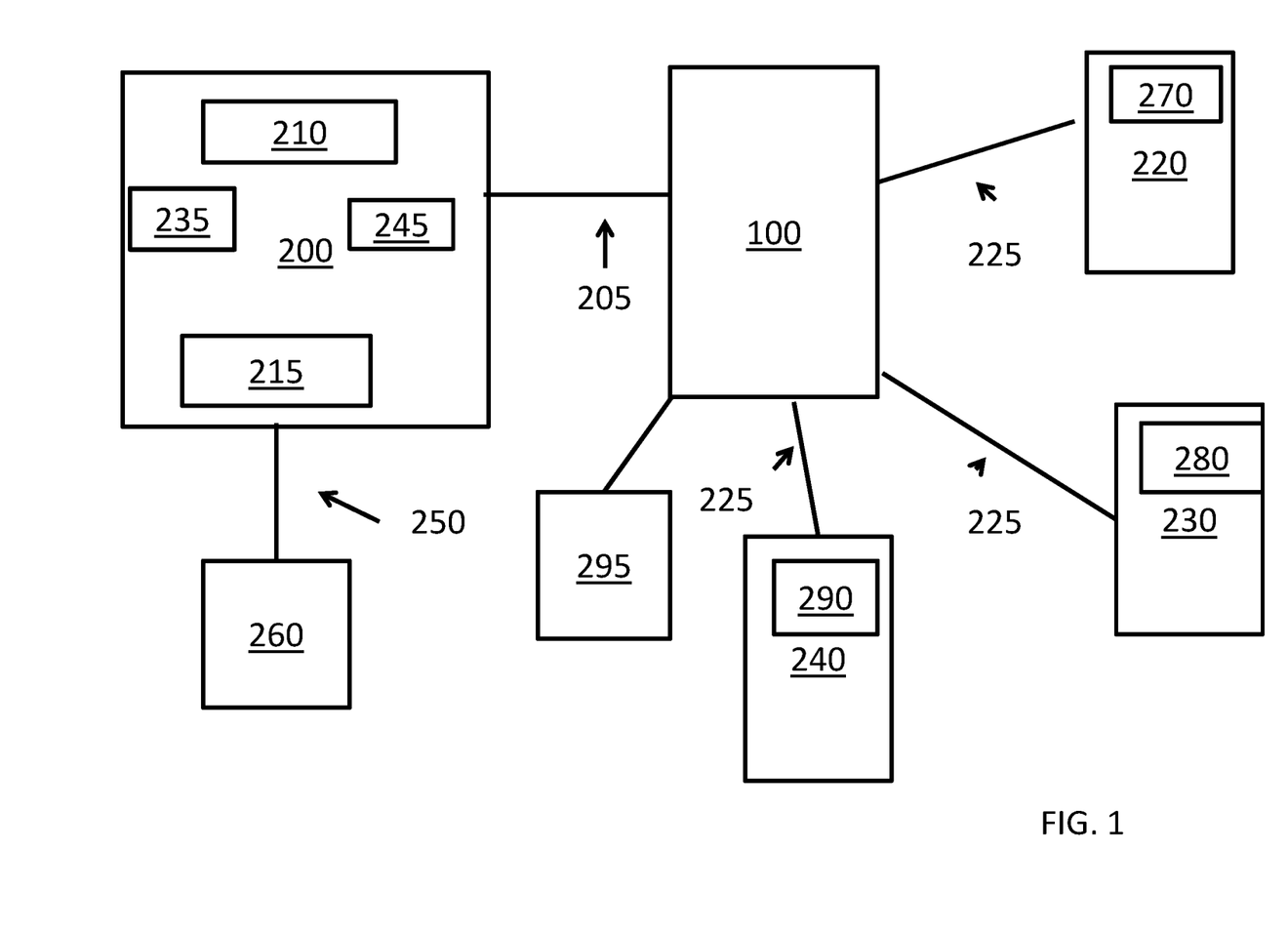
FIG. 1 shows a name pronunciation recommendation system according to one or more embodiments.

Turning now to a more detailed description of the present disclosure, there is shown in FIG. 1 a name pronunciation recommendation system 100 according to one or more embodiments. User device 200 communicates with name pronunciation recommendation system 100 via communication network 205. User device 200 may be any type of computing device capable of submitting a name pronunciation query. Such devices include a desktop computer, a laptop mobile computer, a personal data assistant, a mobile phone, a tablet computer and the like with wired or wireless communication capabilities for communication with a communication network. Each user device may include a user interface 210 such as a screen, a keyboard, touchpad, or microphone and an audio output device 215 which may include a speaker or headphone all which may be internal to the device or externally connected. User device also may include a processor 235 and instructions 245 stored in memory controlling the operation of user device 200 and processed by processor 235. Communication network 205 may be any type of electronic communications network such as a local area network, a personal area network, a home area network, a wide area network, a campus network, an enterprise private network, an internetwork, a backbone network, a global area network, the internet, an intranet, and/or the like and/or a combination of two or more. The user device may communicate with name pronunciation recommendation system 100 from anywhere and anytime via the communication network 205.

Name pronunciation recommendation system 100 also communicates with a plurality of remote databases 220, 230, 240 via communication network 225. Communication network 225 may be similar to communication network 205. Remote databases 220, 230, and 240 include data records 270, 280 and 290 respectively which include the names of individuals and associated personal characteristics which are accessed by name pronunciation recommendation system 100 to provide a name pronunciation recommendation. Data records 270, 280 and 290 may contain audio portions which include pronunciation of a respective name. Remote databases 220, 230 and 240 may be privately or publicly accessible. For example, database 220 may consist of a private enterprise voicemail system which includes audio records of individuals' voice mail introductory greetings which commonly are created using a person's own voice to identify themselves to an external caller. Database 230 may be a database consisting of videos which include individuals identifying themselves verbally providing an audio pronunciation of their name. Such database may include YouTube®, or Facebook®. Database 240 may be a general database which may contain general videos of presentations provided by an individual where their name is pronounced or other source videos where names of individuals are pronounced and are accessible via network 225. Additionally, phonetic database 295 is provided which includes phonetic keys pertaining to the pronunciation of a name. In one or more embodiments, a communication recipient 260 may receive a telephonic communication from user device 200 via communication network 250 and the pronunciation of the recipient's name is the basis for the pronunciation query. Communication network 250 may be the same as or similar to communication network 205.

Figure 2:
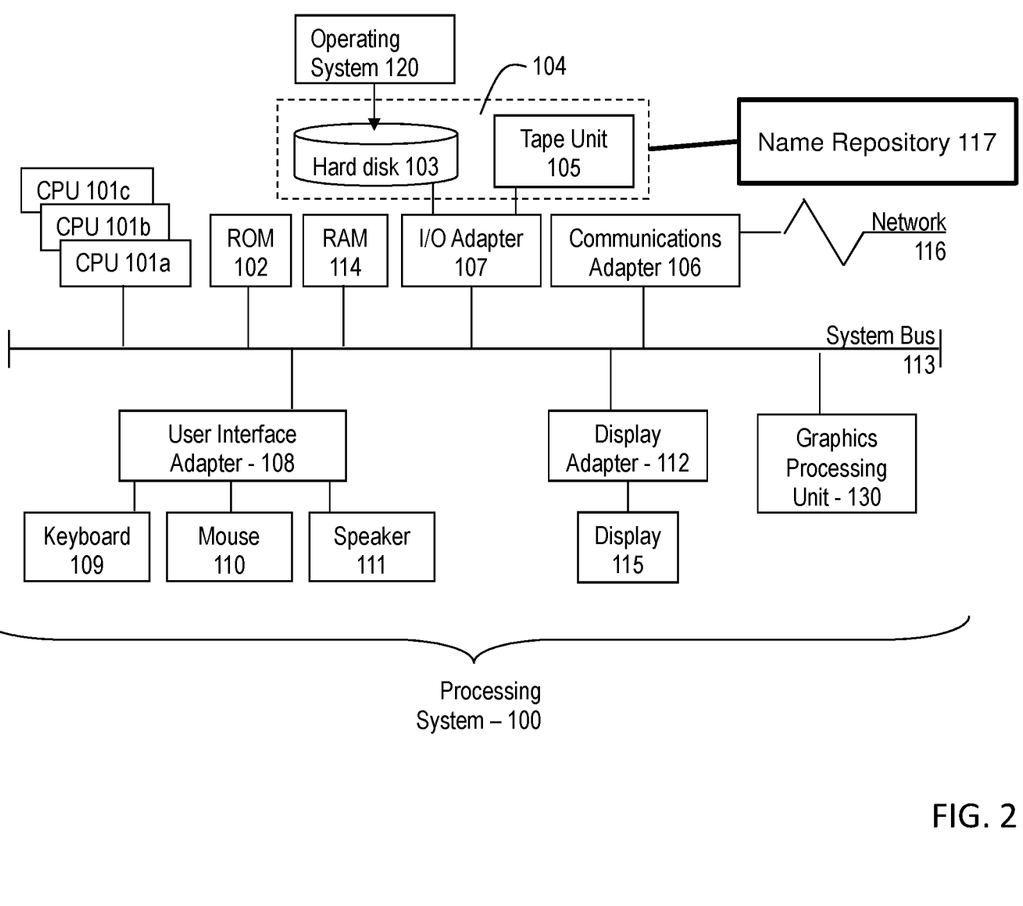
FIG. 2 is a block diagram illustrating one example of a name pronunciation recommendation system for practice of the teachings herein.

Referring to FIG. 2, there is shown a name pronunciation recommendation system 100 according to one or more embodiments. The system 100 has one or more central processing units (processors) 101a, 101b, 101c, etc. (collectively or generically referred to as processor(s) 101). In one or more embodiments, each processor 101 may include a reduced instruction set computer (RISC) microprocessor. Processors 101 are coupled to system memory 114 and various other components via a system bus 113. Read only memory (ROM) 102 is coupled to the system bus 113 and may include a basic input/output system (BIOS), which controls certain basic functions of system 100.

FIG. 2 further depicts an input/output (I/O) adapter 107 and a network adapter 106 coupled to the system bus 113. I/O adapter 107 may be a small computer system interface (SCSI) adapter that communicates with a hard disk 103 and/or tape storage drive 105 or any other similar component. I/O adapter 107, hard disk 103, and tape storage device 105 are collectively referred to herein as mass storage 104. Operating system 120 for execution on the processing system 100 may be stored in mass storage 104. A network adapter 106 interconnects bus 113 with an outside network 116 enabling log management system 100 to communicate with other such systems. A screen (e.g., a display monitor) 115 is connected to system bus 113 by display adaptor 112, which may include a graphics adapter to improve the performance of graphics intensive applications and a video controller. In one or more embodiments, adapters 107, 106, and 112 may be connected to one or more I/O busses that are connected to system bus 113 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 113 via user interface adapter 108 and display adapter 112. A keyboard 109, mouse 110, and speaker 111 all interconnected to bus 113 via user interface adapter 108, which may include, for example, a Super I/O chip integrating multiple device adapters into a single integrated circuit. A name repository file 117 is associated with mass storage 104 for storing data records containing information collected from databases 220, 230 and 240.

Thus, as configured in FIG. 2, the name recommendation system 100 includes processing capability in the form of processors 101, storage capability including the system memory 114 and mass storage 104, input means such as keyboard 109 and mouse 110, and output capability including speaker 111 and display 115. In one or more embodiments, a portion of system memory 114 and mass storage 104 collectively store an operating system to coordinate the functions of the various components shown in FIG. 2.

In exemplary embodiments, name recommendation system 100 accesses databases 220, 230 and 240 to obtain data records 270, 280 and 290 which contain individuals' names to assist in generating a name recommendation. Name recommendation system 100 searches or mines the respective databases for data files for spoken words, phrases, or sequence of words in an audio segment which are indicative of an individual's name. The particular name being searched may be provided via user input device 200 by submitting a query with regards to the pronunciation of a particular name. The name recommendation system includes audio data analysis capabilities, textual data analysis capabilities as well as data mining capabilities utilizing speech recognition technology. Such technology is provided by IBM® Watson® language services including language translation and speech services. In one or more embodiments, these services provide an audio analysis intelligence that provides search capabilities for spoken words to process and search audio data for such information relating to the pronunciation and identification of names. Additional search capabilities are provided which enable additional information to be obtained such as the gender of the individual, the cultural origin of the individual, and the location of the source material to correlate with the geographic location of the individual. The analyzed data records are stored in name repository 117 which is associated with system memory 104.

Figure 3:
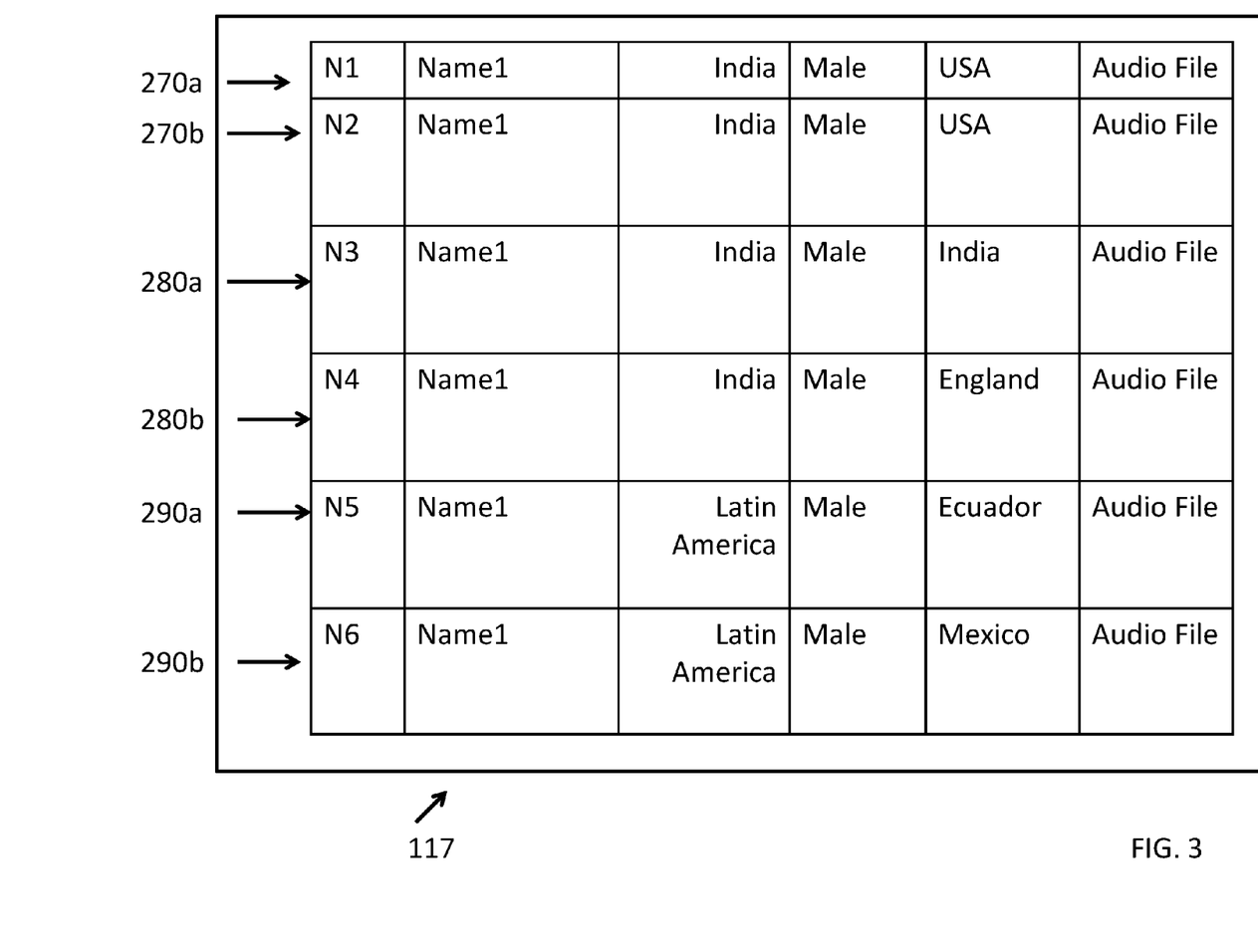
FIG. 3 shows the creation of a name repository in accordance with one or more embodiments.

As shown in FIG. 3, a representation of name repository 117 is provided. In one or more embodiments, name repository 117 may include a plurality of data files containing the pronunciation of individuals from data searches which an end user may request the processing of at any time off-line. In an additional embodiment, name repository is originally empty and dynamically created when a query is submitted by an end user prompting name recommendation system to access the respective databases in real time. In the illustrated embodiment, name repository 117 contains name data files 270a, 270b, 280a, 280b, 290a, and 290b for a particular individual's name, identified as Name1, which were obtained from searching databases 270, 280 and 290 respectively. Name recommendation system 100 processes the data from databases 270, 280 and 290 to obtain data files which contain information associated with the respective search result which may include the individual's name, cultural origin, gender, geographic location and the related audio portion which identifies the person's name being pronounced. In the embodiment shown, a set of six audio records is provided for an individual having a name Name1, their cultural origins, which include India and Latin America, their gender being Male, their location being varied ranging from the United States, India, England, Ecuador, and Mexico and their associated audio file containing a rendering of an audio segment specifically containing an audio rendering of that particular's individual's pronunciation of their name. Multiple embodiments of the data files are possible with respect to the numerous names of individuals present in the world, the multiple cultural origins and geographic locations. The embodiment shown is merely a simple example for illustrative purposes.

Figure 4:
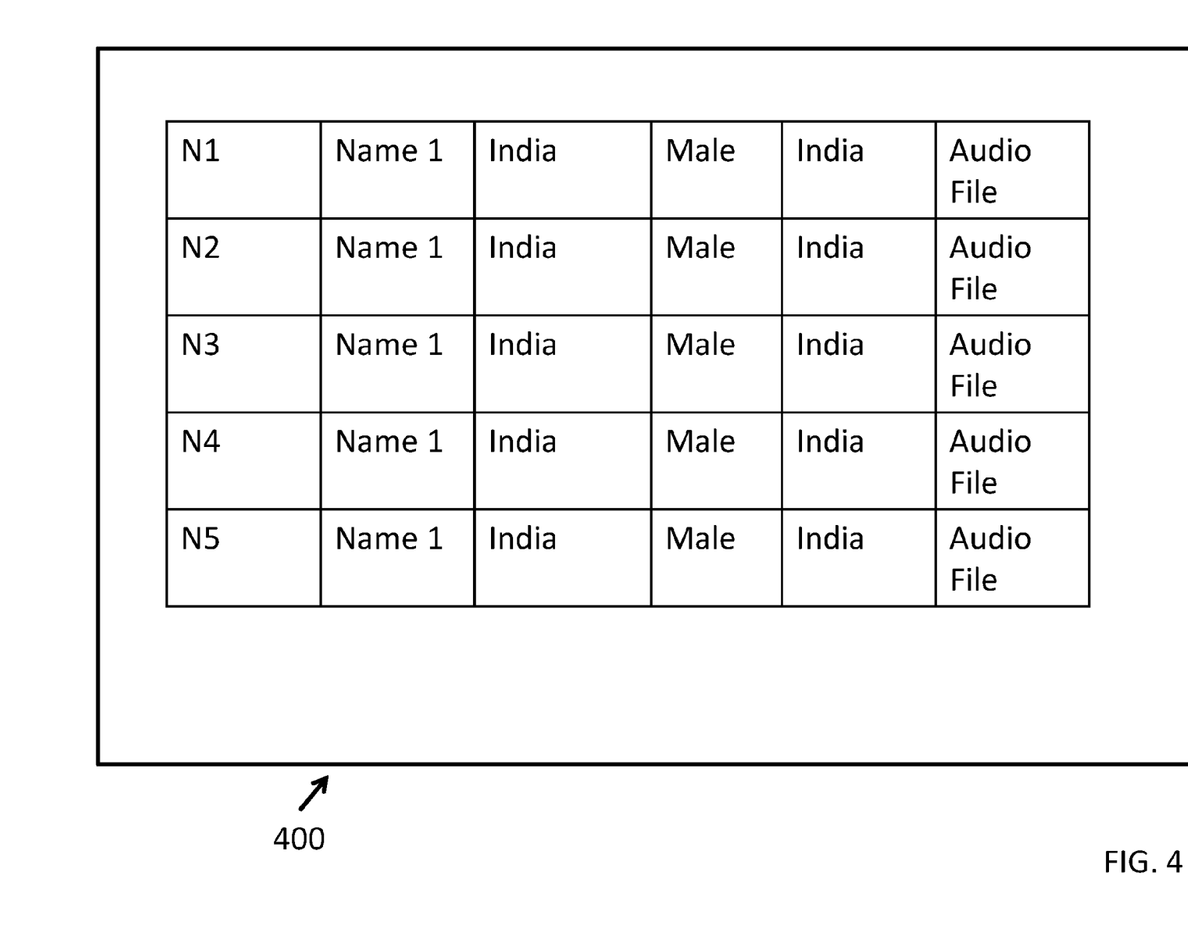
FIG. 4 shows the analysis of audio records for providing a name pronunciation recommendation based upon one or more embodiments.

FIG. 4 illustrates a name pronunciation recommendation ranking 400. Name pronunciation recommendation ranking 400 is produced by name recommendation system 100 based upon a query submitted from user device 200. An end user interfaces with name pronunciation recommendation system 100 by submitting a query requesting a recommendation for pronouncing a particular individual's name. In one or more embodiments, the query may contain the spelling of an individual's name, the person's cultural origin, gender, and geographic location. Such factors assist in differentiating the audio files. For instance, a person's cultural origin may assist in identifying the pronunciation of an individual's name which is Jesus. In certain cultures' the "J" is pronounced one particular way, but in others, the "J" is pronounced differently.

In the embodiment illustrated in FIG. 4, a query has been submitted to name recommendation system 100 for an individual with name Name 1 whose cultural is India, is male and currently lives in India. In one or more embodiments, name recommendation system 100 accesses name repository 117 to analyze the records contained within the repository which satisfy the query. In an additional embodiment, name recommendation system 100 searches databases 270, 280 and 290 in real time for data files containing the requested name in addition to satisfying the additional query requests and stores the data files in the name repository 117 for subsequent analysis. The subsequent subset of data files which include audio files identifying the pronunciation of the individual's name are analyzed by name pronunciation recommendation system 100 to identify similar sounding pronunciations. This analysis involves evaluating the audio portion of each file and matched to others in order to provide a statistical evaluation on the various pronunciations in order to determine the probability that for the particular name being queried, that the results provided by the name pronunciation recommendation system is most likely the correct pronunciation.

As shown in FIG. 4, five different pronunciations of Name 1 were developed by the name pronunciation recommendation system, N1-N5, which also pertained to those specific characteristics as identified by the initial query as being pronunciations associated with Indian males living in India. The different pronunciations with their respective audio file identifying the particular pronunciation is provided in order based upon the statistical ranking of the likelihood that the associated pronunciation is the correct one for the particular name being queried. In one or more embodiments, the statistical ranking is based on the most frequent common pronunciation of a particular pronunciation for that particular name found from the accumulated data records. In the embodiment shown, the respective names are ranked 1 to N based on the frequency of common pronunciation occurrence. In this embodiment, the audio file associated with the pronunciation of N1 is determined to be the most frequent common pronunciation and would be returned to the user device 200 via communication network 205 as the recommended pronunciation and may be played back as audio via the user device's speaker. Additional audio files may be subsequently requested in order to provide different recommendations. If desired additional pronunciation guides may be provided by accessing phonetic database 295.

Figure 5:
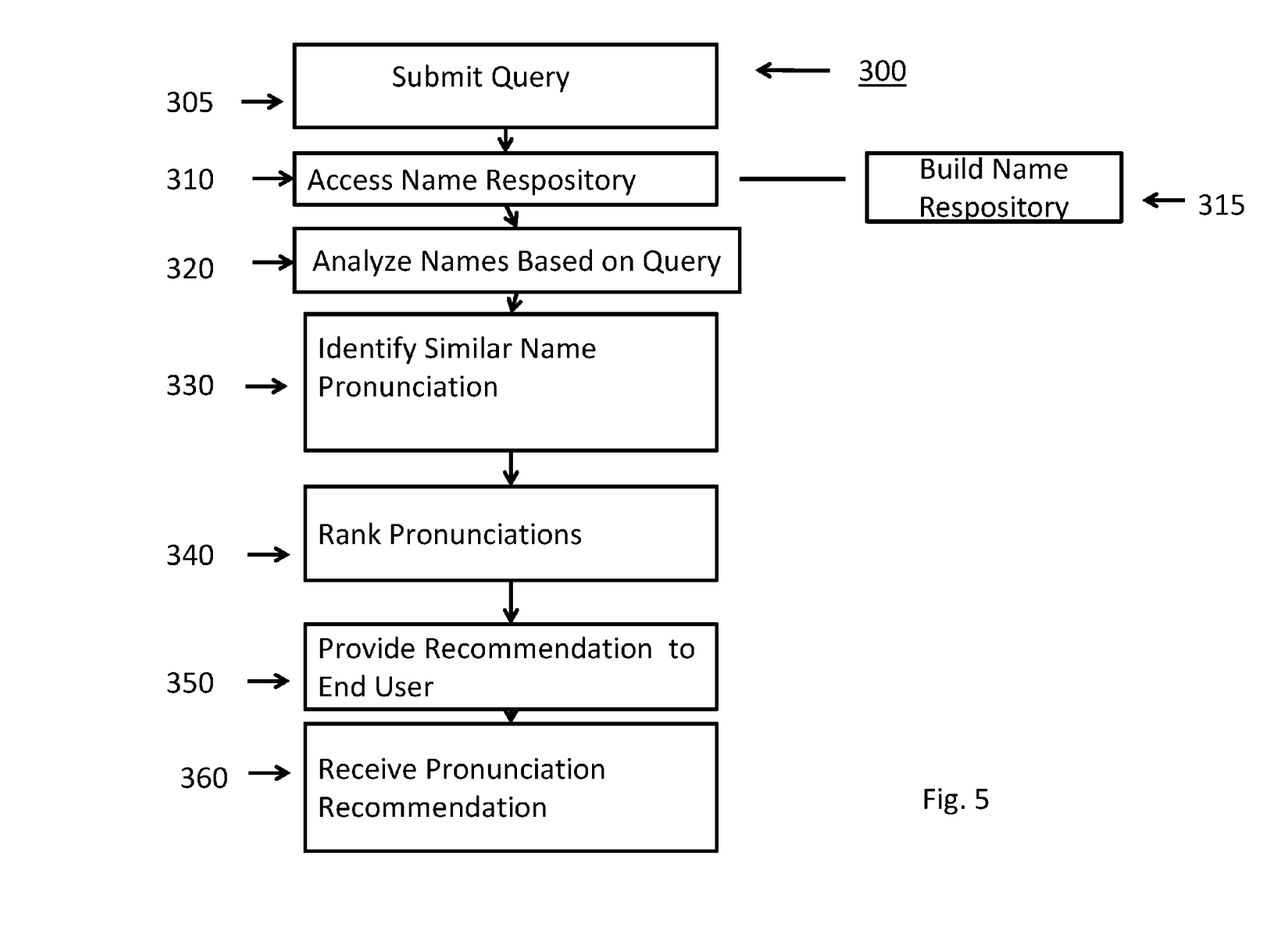
FIG. 5 shows a flow chart illustrating a method for providing a name pronunciation recommendation based upon one or more embodiments.

FIG. 5 illustrates a method for providing a name pronunciation recommendation 300. As shown at block 305, a query is submitted to the name pronunciation recommendation system. The query will identify the name of an individual which the recommendation is regarding. Additional characteristics of the individual such as cultural origin, gender, and origin and other attributes may also be included in the query. The query may originate from an end user prior to the end user communicating with a colleague or other individual via a telephonic communication network. In such an embodiment, user device 200 may be a smart phone which includes a processor to process query instructions via an application and enables the end user to submit the query via the smart phone through the communication network to the name pronunciation recommendation system 100.

After the query is presented to the name pronunciation recommendation system 100, the name repository containing data records is accessed at block 310 and analyzed at block 320 for those data records satisfying the query. In the event that the name repository does not contain data records, the name pronunciation recommendation system 100 accesses remote databases to retrieve data records which satisfy the query and builds the name repository with the retrieved data records at block 315. After the data records satisfying the query have been identified, the respective audio files are analyzed to identify similar name pronunciation of the name being searched at block 330. Upon the analysis of the data records retrieved in response to the query, the data files are grouped together based upon the similar name pronunciation, the grouping of the data files is statistically ranked to provide a name pronunciation recommendation at step 340. The related audio file of the recommended name pronunciation is provided to the end user at block 350 and received by the end user at block 360.

FIG. 1 illustrates an operational embodiment. The end user may desire to place a phone call to a colleague or business associate. The end user may utilize a user device which includes a processor processing instructions for establishing a query for the pronunciation of a name. The instructions for the query may be contained in an application stored in memory of the user device. When placing the call, the end user may be prompted if he or she would like to obtain a recommendation for the pronunciation of the individual whom the end user is placing a call with. The end user may submit a query or decline to submit a query. If a query is submitted, the steps to obtain a name pronunciation recommendation are undertaken by the name pronunciation recommendation system 100 with the recommended name pronunciation returned to the end user. The end user plays the name pronunciation audio file and upon learning of a pronunciation which is statistically likely the correct pronunciation, subsequently initiates the call the individual.

In this illustrative example, the advantage of the embodiment as shown enables individuals to converse with other colleagues and the like with confidence that they are initially interacting with the proper pronunciation of that individual's name. The confidence is provided by obtaining and statistically ranking possible pronunciation alternatives based upon the common pronunciation of a similar name by like individuals with similar gender, cultural origin and geographic location and other possible common attributes.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object-oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method for recommending the pronunciation of a name, the method comprising:
providing, using a processor system, a plurality of audio records wherein the plurality of audio records includes a set of audio records identifying the pronunciation of a common name;
analyzing, using the processor system, the set of audio records identifying the pronunciation of a common name to determine variations in the pronunciation;
determining a most frequent common pronunciation of the common name in the set of audio records; and
presenting the most frequent common pronunciation of the common name to an end user as the recommended pronunciation.

2. The computer-implemented method of claim 1 further includes obtaining the audio records from a plurality of audio sources selected from the group including databases accessible from the internet or proprietary databases.

3. The computer-implemented method of claim 1 further including categorizing the audio records identifying the pronunciation of a common name based upon gender and receiving a query identifying a particular gender, the set of audio records being limited to those audio records corresponding to the gender identified in the query.

4. The computer-implemented method of claim 1 further including categorizing the audio records identifying the pronunciation of a common name based upon geographic origin and receiving a query identifying a particular geographic origin, the set of audio records being limited to those audio records corresponding to the geographic origin identified in the query.

5. The computer-implemented method of claim 1 further including categorizing the audio records identifying the pronunciation of a common name based upon cultural origin and receiving a query identifying a particular cultural origin, the set of audio records being limited to those audio records corresponding to the cultural origin identified in the query.

6. The computer-implemented method of claim 1 further including providing a ranking of pronunciations of the common name based upon frequency of occurrences of the pronunciation of the common name within the set of audio records.

7. The computer-implemented method of claim 1 further including providing phonetic pronunciation keys associated with the common name.

8. The computer-implemented method of claim 1 further including providing a user communication device including a speaker and presenting the recommended pronunciation of the common name via the speaker.

9. The computer-implemented method of claim 1 wherein a query submitted from the user is utilized for determining the set of audio records to be analyzed.

10. The computer-implemented method of claim 1 wherein the set of audio records are categorized based upon parameters selected from the group comprising of geographic origin, gender and cultural origin and the set of audio records to be analyzed are determined based on a query submitted from a user wherein the query includes parameters from the group comprising of geographic origin, gender and cultural origin and wherein the recommended pronunciation is audibly received by the user.

11. A system for recommending the pronunciation of a name, the system comprising:
a memory; and
a processor system communicatively coupled to the memory;
wherein the memory is configured to store a plurality of audio records, wherein the plurality of audio records includes a set of audio records identifying the pronunciation of a common name;
wherein the processor is configured to analyze the set of audio records identifying the pronunciation of a common name to determine variations in the pronunciation;
wherein the processor is further configured to determine the most frequent common pronunciation of the common name in the set of audio records;
wherein the processor is further configured to deliver the most frequent common pronunciation of the common name to an end user over a communications network.

12. The system of claim 11, wherein the memory is configured to store a name repository containing the plurality of audio records.

13. The system of claim 12, wherein the processor is further configured to access a plurality of databases containing audio records for obtaining audio records containing the common name for analyzing their respective pronunciation of the common name.

14. The system of claim 12 further including a user device configured to submit a pronunciation query for a common name to the processor and direct the processor to retrieve and analyze audio records including pronunciations of the common name.

15. The system of claim 14, wherein the user device includes a speaker and the pronunciation of the common name is audibly presented to an end user via the speaker.

16. A computer program product for recommending the pronunciation of a common name, the computer program product comprising a computer readable storage medium having program instructions embodied therewith, wherein the computer readable storage medium is not a transitory signal per se, the program instructions readable by a processing circuit to cause the processing circuit to perform a method comprising:
providing a plurality of audio records wherein the plurality of audio records includes a set of audio records identifying the pronunciation of a common name;
analyzing the set of audio records identifying the pronunciation of a common name to determine variations in the pronunciation;
determining the most frequent common pronunciation of the common name in the set of audio records; and
presenting the most frequent common pronunciation of the common name to an end user as the recommended pronunciation.

17. The computer program product of claim 16 wherein the set of audio records are categorized based upon parameters selected from the group comprising of geographic origin, gender and cultural origin and the set of audio records to be analyzed are determined based on a query submitted from a user, wherein the query includes parameters from the group comprising of geographic location, gender and cultural origin, and wherein the recommended pronunciation is audibly received by the user.

18. The computer program product of claim 16 further including obtaining the audio records from a plurality of audio sources selected from the group including proprietary databases or databases accessible through the internet.

19. The computer program product of claim 16 further including providing a ranking of pronunciations of the common name based upon frequency of occurrences of the pronunciation of the common name within the set of audio records.

20. The computer program product of claim 16, wherein a query submitted from the user is utilized for determining the set of audio records to be analyzed, wherein the query is submitted in response to the initiation of a telephone call to an individual, and wherein the recommended pronunciation is audibly received prior to the initiation of the telephone call to an individual.

* * * * *